United States Patent [19]
Marsden et al.

[11] Patent Number: 5,323,475
[45] Date of Patent: Jun. 21, 1994

[54] OPTICAL CONNECTOR

[75] Inventors: Stephen A. Marsden; Clifford E. Merlo; Paul F. Wettengel, all of Ipswich, England

[73] Assignee: British Telecommunications public limited company, London, England

[21] Appl. No.: 969,309
[22] PCT Filed: Jun. 25, 1991
[86] PCT No.: PCT/GB91/01026
  § 371 Date: Feb. 16, 1993
  § 102(e) Date: Feb. 16, 1993
[87] PCT Pub. No.: WO92/00537
  PCT Pub. Date: Jan. 9, 1992

[30] Foreign Application Priority Data
Jun. 25, 1990 [GB] United Kingdom ............ 9014118

[51] Int. Cl.⁵ .................. G02B 6/00; G02B 6/36
[52] U.S. Cl. ................................... 385/77
[58] Field of Search ........................... 385/75-88

[56] References Cited
U.S. PATENT DOCUMENTS

| | | | |
|---|---|---|---|
| 4,435,036 | 3/1984 | Sasakawa | 350/96 |
| 4,464,817 | 8/1984 | Johnson, Jr. et al. | 29/33 |
| 4,875,755 | 10/1989 | Borgos et al. | 385/78 |
| 4,936,662 | 6/1990 | Griffin | 385/77 |
| 5,058,983 | 10/1991 | Croke et al. | 385/78 |
| 5,071,218 | 12/1991 | Nishimoto | 385/78 X |

FOREIGN PATENT DOCUMENTS

| | | |
|---|---|---|
| 0117273 | 9/1984 | European Pat. Off. |
| 0330399 | 8/1989 | European Pat. Off. |
| 59-38707 | 3/1984 | Japan |

Primary Examiner—Akm E. Ullah
Attorney, Agent, or Firm—Nixon & Vanderhye

[57] ABSTRACT

A connector for connecting an optical fibre (25) to an optical device, comprises a holder (4) and gripping means (5). The holder (4) is formed with a through-bore (21) having first and second end portions (21a, 21b). The first end portion (21a) of the through-bore (21) is sized and shaped to be an interference fit around one end portion (8) of a standard fibre connector (1). The gripping means (5) is engageable with the holder (4) to constrict a portion (21d) of the through-bore (21), thereby to grip the optical fibre (25) which has been inserted into the through-bore via the second end portion (21b).

20 Claims, 5 Drawing Sheets

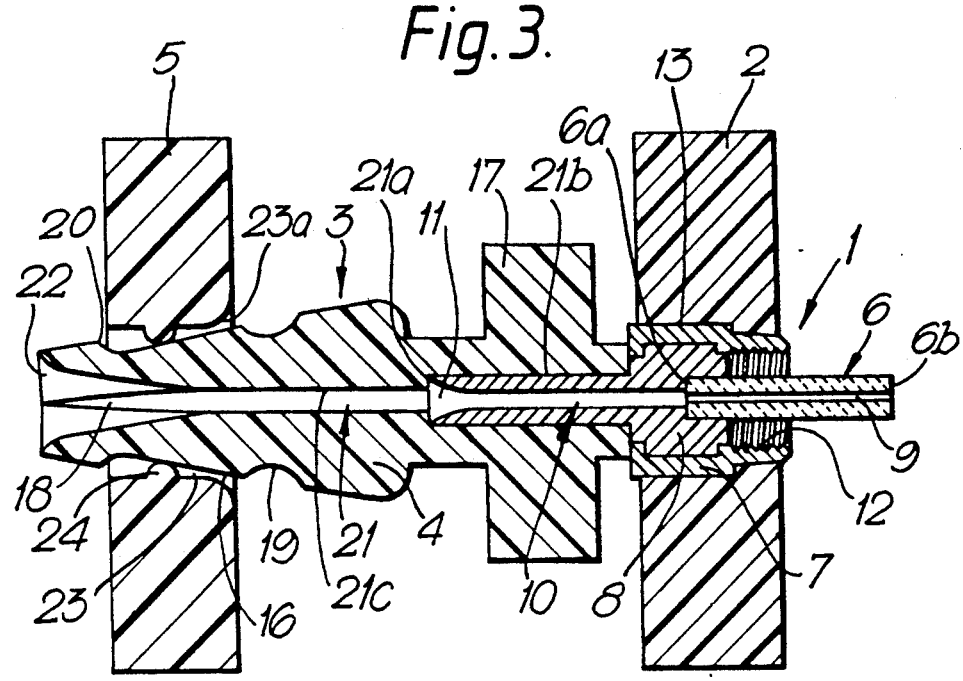
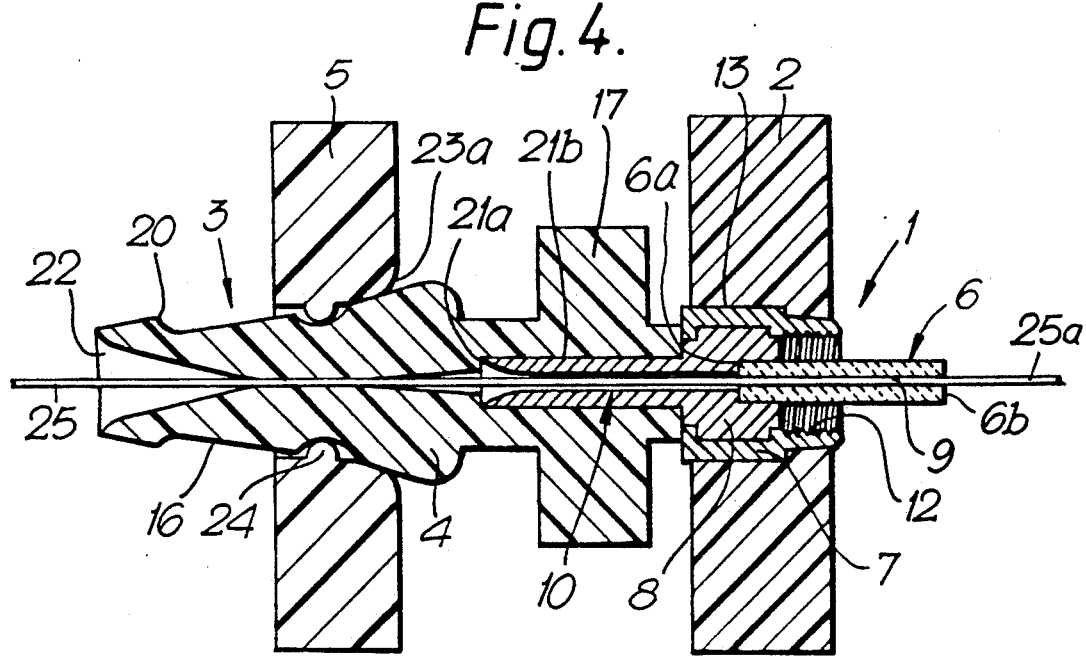

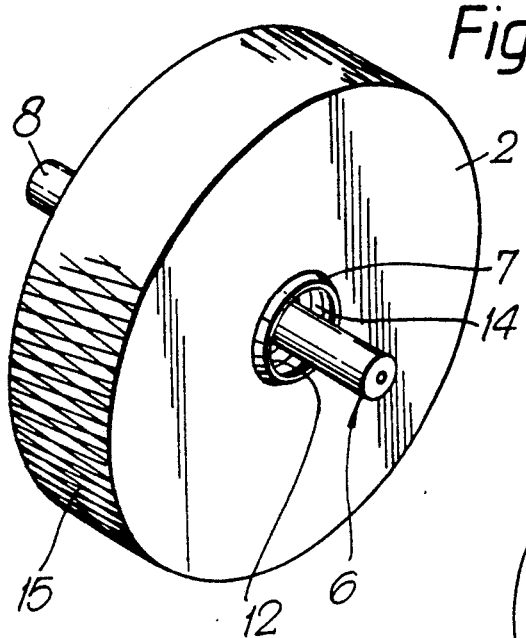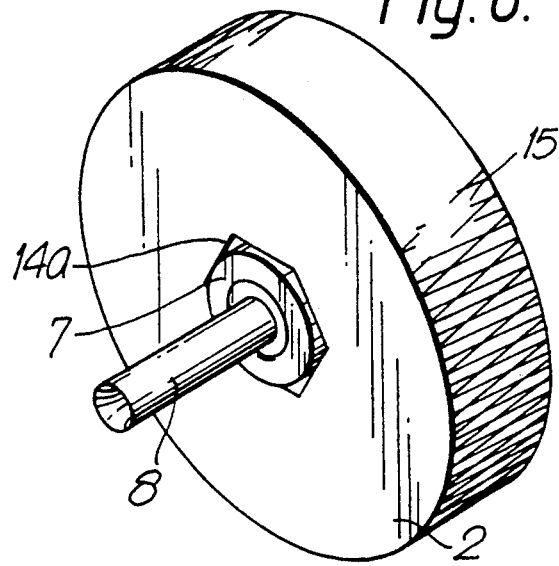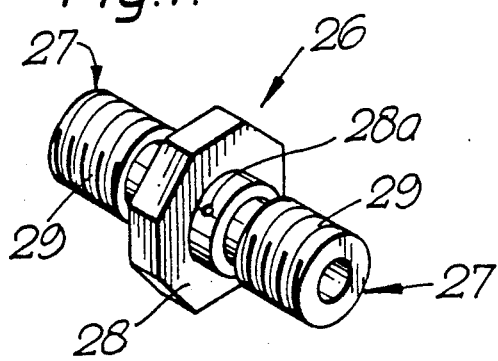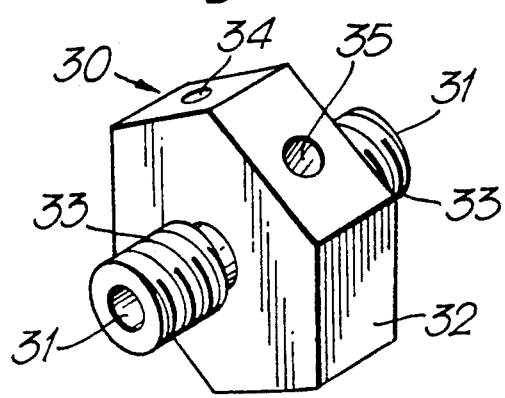

OPTICAL CONNECTOR

BACKGROUND OF THE INVENTION

Field of the Invention

This invention relates to a connector for connecting an optical fibre to an optical device, and in particular to a connector that can be used to connect one optical fibre to another optical fibre, thereby to effect a temporary repair to an optical fibre line.

Related Art

If an optical connection is required between two optical fibres, the fibres may be spliced or connectorised. Splicing forms a permanent connection between the two fibres, usually either by a fusion process (which melts the fibres together), or by the use of an adhesive to glue the fibres together. In either case, splicing is an intricate operation involving accurate manipulation of the fibres. When splices are made during routine installation and repair, complex and expensive splicing apparatus must be used for fibre alignment, and the operator, although sometimes in restricted surroundings, must manipulate the fibres with dexterity.

An important step in the splicing process is that of cleaving the optical fibres. In order to achieve a splice of low optical loss ($<1$ dB), it is necessary to cleave each fibre end to produce an optically-flat surface across most of its end face. Additionally, such an end face must make a small angle ($<3°$) with the plane normal to the fibre axis. As a result, cleavers which are used to cleave optical fibres before splicing are fairly complex devices, requiring dexterity in use from the operator.

Connectorising is a process in which a demountable optical connection is made between two optical fibres. Currently two methods of connectorising optical fibres are known, namely to splice a pre-terminated connector tail onto each fibre, or to terminate each fibre with a connector assembly. Known termination techniques involve permanently fixing a connector assembly to a fibre end, and grinding or polishing the entire end face of the connector assembly, thereby to produce an optically-flat, fibre end face at a small angle to the plane normal to the fibre axis. This is necessary to achieve a low loss connection between the fibres.

Thus, both the known methods of connecting optical fibres, splicing and connectorising, currently require the use of complex apparatus and dexterity from the operator. However, there are circumstances when operator dexterity is hindered, for example if it is necessary for protective clothing to be worn such as is the case in contaminated areas. It is then difficult to ensure that a good optical connection is made, even for the purpose of temporary repair.

U.S. Pat. No. 4,435,036 describes an optical fibre connecting device that enables an optical fibre to be connected to an ordinary connector. One end portion of the connecting device is adapted to fit into the ordinary connector, this end portion having a conical insertion bore for receiving the free bare end of the inserted fibre. Unfortunately, this arrangement results in a large air gap between the end face of the bare fibre and the fibre associated with the ordinary connector, and this leads to unacceptably high connection losses. The device and the ordinary connector are also very small, and so are extremely difficult to manipulate in circumstances when operator dexterity is hindered.

BRIEF SUMMARY OF THE INVENTION

The present invention provides a connector for connecting an optical fibre to an optical device, the connector comprising a holder and gripping means, the holder being formed with a through-bore having first and second end portions and an intermediate portion, the first end portion of the through-bore being sized and shaped to be an interference fit around one end portion of a standard fibre connector, and the gripping means being engageable with the holder to constrict the intermediate portion of the through-bore thereby to grip an optical fibre inserted into the through-bore via the second end portion.

Advantageously, the first end portion of the through-bore has a larger diameter than the intermediate portion, the first end portion being separated from the intermediate portion by a step in the through-bore, and the mouth of the second portion tapers inwardly.

In a preferred embodiment, the holder is shaped to define an external frustoconical surface whose axis coincides with that of the through-bore. An annular collar may constitute the gripping means, the annular collar being movable along the frustoconical surface of the holder thereby to constrict said portion of the through-bore. Preferably, the holder is formed with a circumferential groove positioned at the wider end portion of the frustoconical surface, and the inner circumferential edge of the collar is formed with the flange which is engageable within said groove.

The holder may be formed with a diametral slot extending from the end thereof containing the second end portion of the through-bore, the slot extending at least as far as said groove.

The invention also provides a connector assembly comprising a connector as defined above and a standard optical connector. Conveniently, the standard optical connector is constituted by a ferrule housing, a ferrule holder mounted within the ferrule housing, and a ferrule fixedly mounted within the ferrule holder, the ferrule and the ferrule holder extending in opposite directions away from the ferrule housing. In this case, the first end portion of the through-bore is sized and shaped to be an interference fit around the ferrule holder of the standard optical connector.

Preferably, the assembly further comprises a gripper for gripping the ferrule housing. Conveniently, an annular ring constitutes the gripper, the ferrule housing being an interference fit within the inner peripheral edge portion of the annular ring.

The assembly may further comprise a uniter, the uniter comprising a pair of co-axial tubular arms extending in opposite directions from a housing which has a bore in alignment with the bores defined by the tubular arms, one of the tubular arms being adapted to fit around the ferrule of the standard optical connector and within the ferrule housing of that standard optical connector. Advantageously, the other tubular arm is adapted to fit around the ferrule of another standard optical connector and within the ferrule housing of that other standard optical connector. Preferably, the tubular arms of the uniter are provided with external screw threads for engagement with internal screw threads on the corresponding ferrule housings. Where refractive index matching fluid is used with the assembly, the uniter housing is formed with a radial bore which terminates in the central bore thereof.

The invention also provides a method of terminating an optical fibre using a standard optical connector and a connector, the standard optical connector being constituted by a ferrule mounted in a ferrule holder, and the connector being constituted by a holder and a gripper, the connector holder being formed with an axial through-bore having first and second end portions and an intermediate portion, the method comprising the steps of:

a) fixing the standard optical connector to the connector holder with the ferrule holder of the standard optical connector positioned as an interference fit within the first end portion of the through-bore in the connector holder;

b) stripping the coating from an optical fibre to form a length of bare fibre at the end portion thereof;

c) inserting the optical fibre, bare end portion first, into the through-bore in the connector holder from the second end portion thereof, until the free end of the bare fibre end portion projects from the ferrule of the standard optical connector;

d) applying the gripper to the connector holder to constrict the intermediate portion of the through-bore, thereby firmly to grip the optical fibre in the intermediate portion; and e) cleaving the projecting portion of the bare fibre substantially flush with the free end face of the ferrule.

The invention further provides apparatus for stripping the protective coating from an optical fibre, the apparatus comprising first and second supports, each of which is provided with an absorbent pad on one surface thereof, and means for clamping the second support to the first support so that the absorbent pads are pressed resiliently together, whereby, in use, liquid solvent can be applied to the absorbent pads, an optical fibre can be positioned between the absorbent pads, the two supports can be clamped together, and the optical fibre can subsequently be withdrawn from between the pads with the two supports in the clamped position.

BRIEF DESCRIPTION OF THE DRAWINGS

The invention will now be described in greater detail, by way of example, with reference to the accompanying drawings, in which:

FIG. 3 is a sectional view similar to that of FIG. 2, but shows the assembly ready to receive an optical fibre;

FIG. 4 is a sectional view similar to that of FIG. 2, but shows the assembly gripping an optical fibre;

FIG. 5 is a perspective view showing one aspect of part of the assembly of FIGS. 1 to 4;

FIG. 6 is a perspective view showing another aspect of said part of the assembly;

FIG. 7 is a perspective view of a first form of uniter for use with the assembly of FIGS. 1 to 6;

FIG. 8 is a perspective view of a second form of uniter for use with the assembly of FIGS. 1 to 6;

DETAILED DESCRIPTION OF EXEMPLARY EMBODIMENTS

Figure 1:
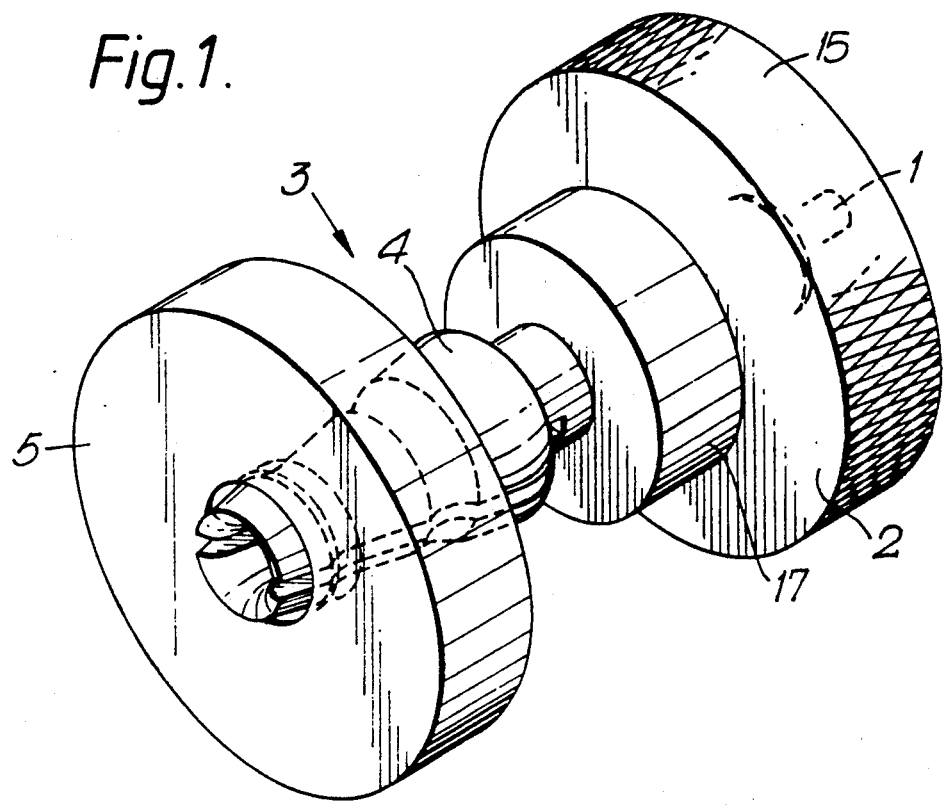
FIG. 1 is a perspective view of a connector constructed in accordance with the invention, the connector being shown in the assembled position together with a first form of standard optical connector.

Referring to the drawings, FIG. 1 shows a connector assembly comprising a standard SMA optical connector (such as an LEETEC FSMA No. 905) 1 mounted in a collar 2, and a connector 3 constructed in accordance with the invention. The connector 3 comprises a holder 4 and a gripper ring 5. The SMA connector 1 comprises a ferrule 6, a housing 7 and a ferrule holder 8. The ferrule 6 is made from a ceramic material, and the housing 7 and the ferrule holder 8 are made of stainless steel. The ferrule 6 is an accurately-machined, right circular cylinder which has a through-bore 9 centred on its longitudinal axis. The outer diameter of the ferrule 6 is 7 mm. The bore 9 provides sufficient clearance for an optical fibre, usually of 125 $\mu$m diameter, to pass therethrough. The ferrule 6 is mounted in the ferrule holder 8 which serves to centralise the ferrule within the housing 7. The ferrule holder 8 is rotationally symmetric about its longitudinal axis, and is provided with a through-bore 10 centred on this axis. This bore 10 is of larger diameter than, and co-axial with, the bore 9 in the ferrule 6, and is tapered from one end 11 to facilitate the entry of an optical fibre. The housing 7 retains the ferrule holder 8, allowing relative rotation between the two, but constraining movement of the ferrule holder in all other directions. The housing 7 is provided with an internal screw thread 12 which extends as far as the ferrule holder 8. The housing 7 is generally rotationally symmetric except for six flats 13 machined on its outer surface.

As shown best in FIGS. 1, 5 and 6, the collar 2 comprises a circular disc with a central through-bore 14, and a knurled circumferential edge 15. This bore 14 has a portion 14a of regular hexagonal shape, this portion providing an interference fit for the housing 7 as shown in FIG. 6. The diameter of the collar 2 is about 3 cm, thereby facilitating handling of the collar and hence handling of the connector 1 when its housing 7 is fixed within the bore 14.

The holder 4 (see FIGS. 2 to 4) has a substantially frustoconical part 16 and a disc-shaped part 17. The holder 4 is rotationally symmetric about the longitudinal axis of the frustoconical part 16 except for a diametral slot 18. A groove 19 and a shoulder 20 are formed in the frustoconical part 16 of the holder 4. An axial through-bore 21 is provided in the holder 4. The bore 21 is stepped, having a shoulder 21a which separates a wider portion 21b from a narrower portion 21c. The wider bore portion 21b, which extends through the disc-shaped part 17, provides an interference fit for the ferrule holder 8 of the SMA connector 1. The holder 4 is provided with a tapered circular opening 22 which tapers down to meet the narrower bore portion 21c.

The gripper ring 5 is disc-shaped, of similar dimensions to the collar 2, and has a central through-bore 23. One end 23a of this bore 23 is smoothly tapered to allow the easy entry of the holder 4. The inner circumferential wall of the gripper ring 5 is provided with an annular protuberance 24 shaped to fit into the groove 19.

The collar 2, the holder 4 and the gripper ring 5 are all made from nylon or a similar polymer. It is particularly preferable that the holder 4 is constructed from a material possessing some elastic properties.

Figure 2:
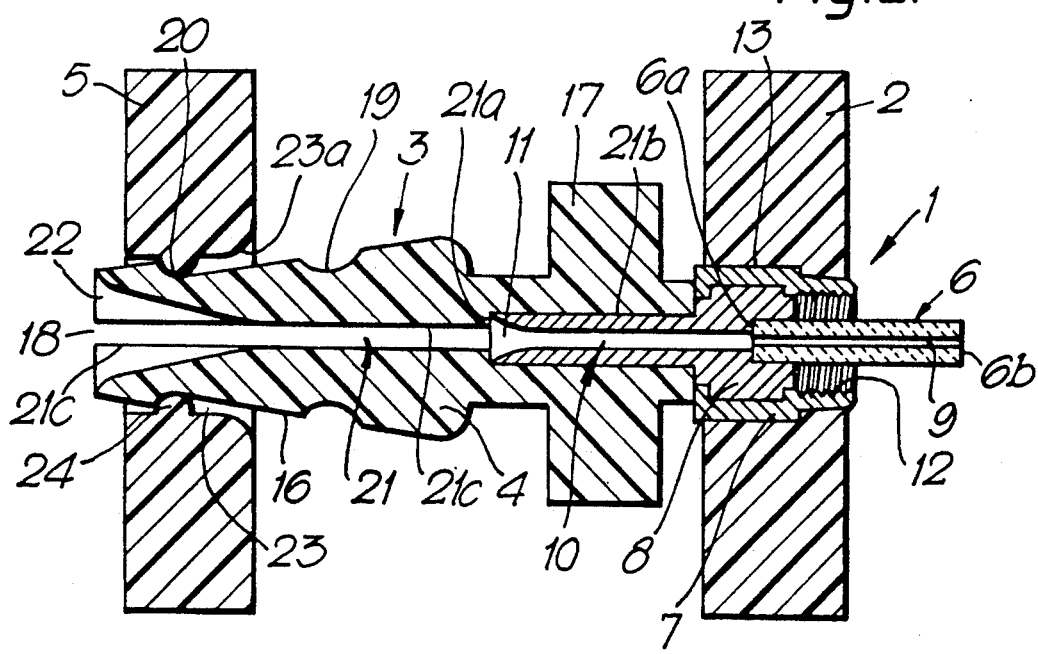
FIG. 2 is a sectional view of the connector assembly of FIG. 1.

In order to provide a termination for an optical fibre 25 (see FIG. 4), the connector 3 is assembled with the protuberance 24 of the gripper ring 5 against shoulder 20 of the holder 4 (see FIG. 2). The free end portion of the optical fibre 25 is then stripped (in a manner described below with reference to FIGS. 12 and 13) to form a bare fibre section 25a. The gripper ring 5 is then moved to a position in which the protuberance 24 is between the shoulder 20 and the groove 19, as shown in FIG. 3. This operation is easily achieved due to the size and shape of the gripper ring 5 and the collar 4, the operation being usually performed with one hand by pressing the ring and the collar together. The exact position of the gripper ring 5 is not critical. As the gripper ring 5 moves along the frustoconical portion 16 of the holder 4, the slot 18 is forced to close at the end of the holder (see FIG. 3), thereby forming a smooth mouth for the large tapered circular opening 22. The widest part of this opening 22 is approximately 2.3 mm in diameter, which facilitates insertion of the bare fibre 25a even if the operator is wearing cumbersome gloves. As the bare fibre 25a is pushed into the opening 22, its curved, tapered shape aligns the fibre with the tapered end 11 of the bore 10 in the ferrule holder 8, and the fibre passes on through the bore 9 in the ferrule 6 until the remaining primary coating on the fibre 25 contacts the end 6a of the ferrule (see FIG. 4).

The gripper ring 5 is then moved further along the holder 4 until its annular protuberance 24 snaps into the groove 19. This again is easily achieved by the operator exerting light pressure between the ring 5 and the collar 2. Owing to the relative diameters of the gripper ring protuberance 24 and the groove 19, the slot 18 is closed further. This causes the bore 21 to be constricted over a portion 21d of its length, so that the fibre 25 is firmly gripped in this region (see FIG. 4).

For a fibre 25, having a diameter 125 $\mu$m and a primary coated diameter of 250 $\mu$m, the width of the slot 18 (that is to say the diameter of the through-bore 21) at this region 21d will be approximately 180 $\mu$m. In practice, as the holder 4 and the ring 5 are made of nylon, the width of the slot 18 at the region 21d tends to lie in the range of from 180 $\mu$m to 190 $\mu$m. This minimum width ensures that the fibre 25 is firmly gripped whilst avoiding significant optical loss from the fibre. This firm grip on the fibre 25 enables subsequent steps in the connection process to be carried out handling only the connector 3 and without fear that the fibre will move relative to the connector 3.

The bare fibre 25a projecting from the ferrule 6 is now cleaved, using simple, side cutters (not shown) as close to the free end of the ferrule as possible. This crude cleaving process is again easy to perform, even for an operator of limited dexterity, since no additional alignment or clamping of the optical fibre 25 is required during the cleaving process. Using a canister of compressed gas (not shown), the small chards of fibre resulting from the crude cleaving process are blown away from the end face 6b of the ferrule 6.

The connector assembly constituted by the connectors 1 and 3 and the collar 2 thus holds the optical fibre 25 firmly in position, with the bare fibre 25a having a cleaved end face substantially flush with the end face 6b of the ferrule 6. This assembly can then be connected to a second standard optical connector (preferably of the same type as the connector 1) by means of a uniter, examples of which are shown in FIGS. 7 and 8. FIG. 7 shows a uniter 26 having a pair of tubular arms 27 extending, in opposite directions, from a housing 28. The bores defined by tubular arms 27 are co-axial, have the same diameter, and are contiguous with a central bore (not shown) formed in the housing 28. Each of arms 27 is provided with an external screw thread 29 which is complementary to the internal screw thread 12 of the connector 1. The bore of each arm 27 is of such a diameter that the ferrule 6 of the connector 1 is an interference fit therewithin. The uniter 26 is dimensioned so that, when a pair of connectors 1 are screwed onto its arms 27, their ferrule end faces 6b lie closely adjacent to one another within the housing 28. A small radial bore 28a is provided in the housing 28, this radial bore terminating in the central bore of the housing.

In use, the unit 26 is fixed to the connector assembly by screwing one of its arms 27 into the internal screw thread 12 of the connector housing 7. This arrangement is then fixed to a second standard optical connector by screwing the other arm 27 of the uniter 26 into the connector housing of that connector, a refractive index matching compound (a fluid or gel) having previously been injected into the bore of that arm using a syringe (not shown). The bore 28a permits the escape of excess refractive index matching compound as the second ferrule approaches the ferrule 6 of the connector assembly. Once the two arms 27 are firmly screwed into their respective connector housings, a good optical connection is achieved between the optical fibre 25 and the optical fibre associated with the second connector. The second connector can either be a standard optical connector mounted on a bulkhead, or a connector forming part of a second connector assembly. In either case, becaused the cleaved end face of the bare fibre 25a is substantially flush with the ferrule end face 6b, and because of the use of refractive index matching compound, there is no air gap between the two optical fibres.

Where two connector assemblies of the type shown in FIGS. 1 to 4 are used to connect a pair of optical fibres, the total connection loss between the connected fibres is surprisingly low. Thus, where the optical fibres have a 50 $\mu$m core diameter, a 125 $\mu$m fibre diameter, and are primary coated to a total diameter of 250 $\mu$m, the average optical loss between the two connected fibres is less than 0.2 dB for a measurement wavelength of 1300 nm. This low and reproducible connection loss is surprising, given the crude cleaving technique used, and the fact that no polishing, complex alignment or fusion processes are used in this connection system. It is believed that the success of the gripping action in holding the fibre ends flush to the ferrule end faces, once they have been cleaved, in combination with the use of the refractive index matching compound, are significant factors in achieving this surprisingly low connection loss. Thus, this type of connector can be used to provide a simple system for connecting optical fibres which requires minimum handling dexterity, and gives surprisingly low connection loss.

FIG. 8 shows another form of uniter 30, this uniter having a pair of tubular arms 31 extending, in opposite directions, from a housing 32. Each of the arms 31 is provided with an external screw thread 33 which is complementary to the internal screw thread 12 of the connector 1. As with the uniter 26, the bores defined by the arms 31 are co-axial and aligned with a central bore (not shown) in the housing 32. The housing 32 is provided with a radial bore 34 which terminates in the central bore, the radial bore permitting the escape of excess refractive index matching compound. The housing is also provided with a second radial bore 35, this bore acting as a reservoir for refractive index matching compound, thereby ensuring a constant supply of compound to the central bore after the uniter 30 has been assembled with a pair of connectors.

Figure 9:
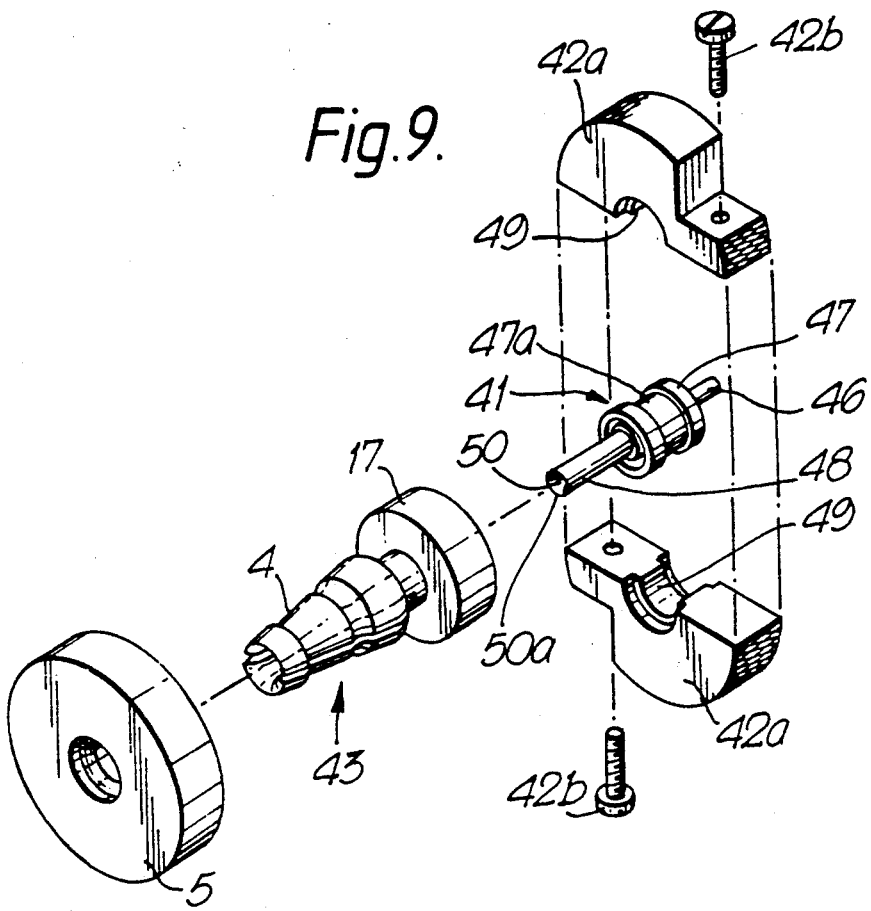
FIG. 9 is an exploded perspective view of an assembly of the connector of the invention and a second form of standard optical connector.
Figure 10:
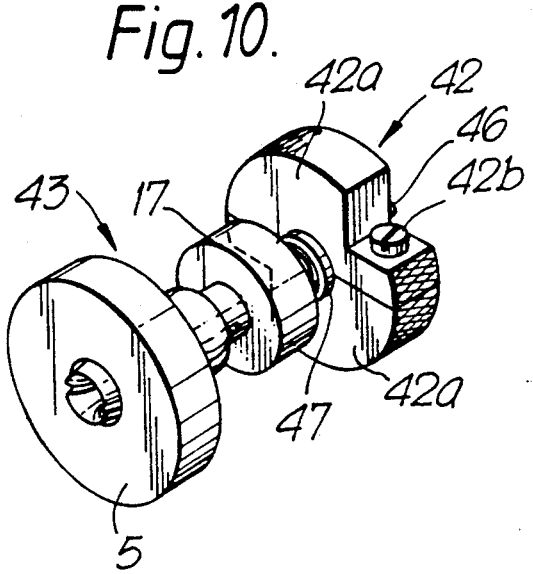
FIG. 10 is a perspective view of the assembly of FIG. 9 in the assembled position.
Figure 11:
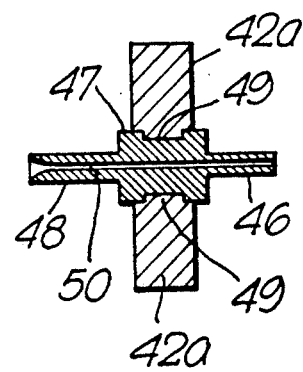
FIG. 11 is a sectional view of the standard optical connector of the assembly of FIGS. 9 and 10.

FIGS. 9 to 11 show a connector assembly comprising a standard ST connector (such an AT&T Mark II) 41 mounted in a two-part collar 42, and a connector 43 constructed in accordance with the invention. The connector 43 is identical with the connector 3 of FIGS. 1 to 4, and so like reference numerals will be used for like parts.

The connector 41 comprises a ferrule 46, a housing 47 and a ferrule holder 48. The ferrule 46 is similar to the ferrule 6, having a central through-bore (not shown) and an outer diameter of 7 mm. The ferrule 46 is made of a ceramic material, and the housing 47 and the ferrule holder 48 are made of a plastics material. The ferrule 46 is an interference fit within the ferrule holder 48, and its through-bore is co-axial with, but of smaller diameter than, a through-bore 50 formed in the ferrule holder. The bore 50 is tapered from one end 50a to facilitate entry of an optical fibre. The ferrule holder 48 is mounted in the housing by a bayonet fixing (not shown), a spring (not shown) acting between the housing and a flange (not shown) formed on the holder. The spring thus acts to bias the ferrule 46 outwardly with respect to the housing 47.

The collar 42 is constituted by a pair of identical, generally semi-cylindrical parts 42a which are connected together to grip the housing 47 by means of screws 42b. Each collar part 42a has a flange 49 on the inner circumferential edge portion, these flanges engaging within a central, circumferential groove 47a formed in the housing 47, thereby to lock the housing to the collar 42 when the screws 42b are tightened.

An optical fibre can be terminated using the connectors 41 and 43 in a similar manner to that described above with reference to FIGS. 2 to 4. In this case, however, the bare fibre which protrudes from the ferrule 46 is polished after cleaving, this being simply accomplished by rubbing the cleaved fibre end surface for 15 to 20 "figure of eight" turns on two or three grades of polishing paper. In this case, the bare fibre is cleaved using a simple sapphire-tipped or diamond-tipped blade cleaver having a spacer which engages the ferrule end face to ensure that cleaving occurs 4 or 5 fibre diameter lengths away from the ferrule end face. The subsequent polishing operation ensures that the fibre end face is flat and substantially perpendicular to the fibre axis. During polishing, the protruding portion of the fibre is forced back into the ferrule and its holder, the fibre bending slightly within the larger bore within the ferrule holder to permit this. Once the polishing process is finished, the natural resilience of the fibre causes the fibre to protrude from the ferrule by 4 to 5 fibre diameters.

The connector assembly constituted by the connectors 41 and 43 and the collar 42 thus holds the optical fibre firmly in position with the bare fibre end portion protruding from the ferrule end. The assembly can then be connected to a second standard optical connector (preferably of the same type as the connector 41) by means of a uniter (not shown). The uniter used for this embodiment is generally similar to the uniter 26, but its central housing has no need of a radial bore. This is because, when the uniter is screwed into the connector housings, the polished bare fibre end faces are pressed resiliently together, thereby ensuring that there is no air gap therebetween and hence there is good optical contact between the two fibres without the need for refractive index matching compound. In this connection, it should be noted that an ST connector always has a small length of bare fibre protruding from the end face of its ferrule.

Figure 12:
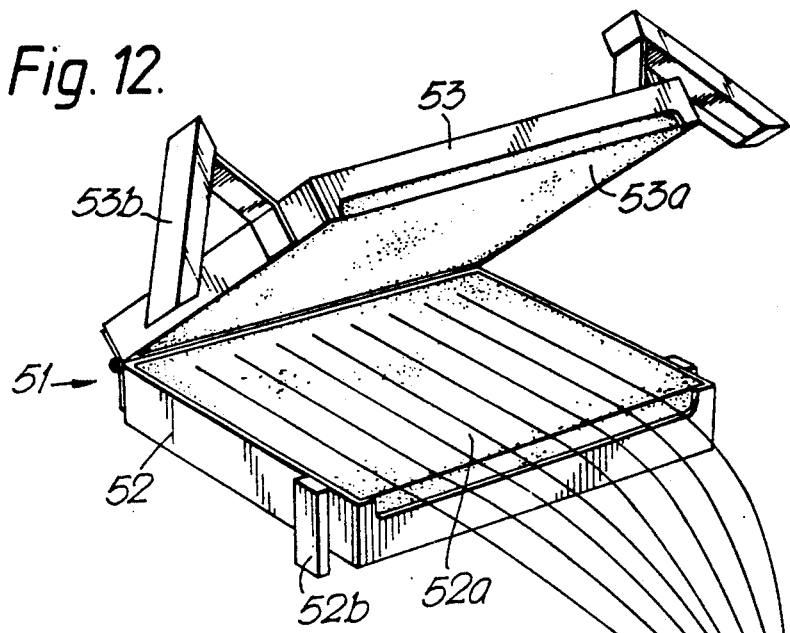
FIG. 12 is a perspective view of a stripping box, in the open, fibre-receiving position, the stripping box being usable to prepare optical fibres for insertion into connector assemblies of FIGS. 1 to 11.
Figure 13:
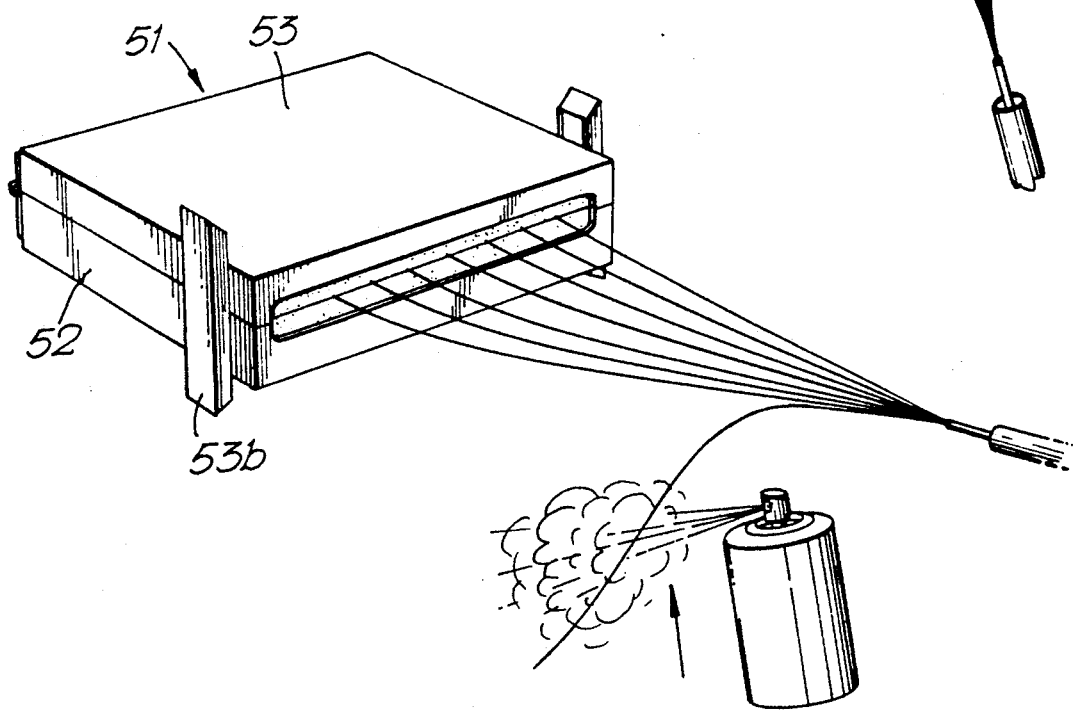
FIG. 13 is a perspective view of the stripping box of FIG. 12 in the closed, operational position.

FIGS. 12 and 13 show a stripping box 51 which can be used to prepare bare fibre end portions for optical fibres for use with the connectors 3. The stripping box 51 has a base 52 and a lid 53 hinged thereto. The internal, facing surfaces of the base 52 and the lid 53 are provided with felt pads 52a and 53a respectively. Catches 52b and 53b respectively are provided on the base 52 and the lid 53 for locking the lid to the base with the felt pads 52a and 53b firmly pressed together.

In use, the free ends of the primary coated optical fibres to be connected are placed on the felt pad 52a of the base 52. A liquid solvent, such as dichloromethane, is poured over the fibres, and the lid 53 of the box 51 is closed and fastened to the base 52 by the catches 52b and 53b. After two or three minutes, the fibres are pulled out from between the felt pads 52a and 53a without releasing the catches 52b and 53b. Owing to the mechanical action of the felt pads 52a and 53a, and the chemical action of the liquid solvent, the primary coatings (usually a uv-cured acrylate) are stripped from the optical fibres. The remains of the primary coatings and liquid solvent are removed from the fibres using a sprayed-on solvent cleaner (such as trichlorethelene) and a tissue. This stripping process results in optical fibres which are bare of all coatings, and clean, over the last approximately 10 cm of their lengths.

The connectors described above are suitable for use in situations where two free ends of optical fibre, or one free end and one pre-terminated end, need to be connected, at least temporarily and is particularly suitable in situations when an operator's dexterity is limited, for example by cumbersome gloves. A particular scenario which will find use is when a section of optical fibre cable has been damaged and needs to be replaced under less than ideal conditions, for example, if the operator is wearing a NBC Nuclear, Bacteriological and Chemical) warfare suit. In this situation, a length of optical fibre cable or patchcord which has been pre-terminated at each end, either by using the present connection system or by some other means, is brought to the site of the damaged section. The two damaged ends of the cable can then be prepared for connection to the patchcord using the connections described above, even though the operator is hindered by cumbersome protection clothing. The repair can then be effected by connecting each end of the damaged cable, suitably terminated using such connectors to one end of the patchcord. The damaged cable and the patchcord may contain one or more optical fibres, and may be part of a blown fibre cabling system or any other cabling system.

We claim:

1. A connector for connecting an optical fibre to an optical device, the connector comprising:

a holder and gripping means, the holder being formed with a through-bore having first and second end portions and an intermediate portion, the first end portion of the through-bore being sized and shaped to be an interference fit around one end portion of a standard fibre connector, the gripping means being engageable with the holder to constrict the intermediate portion of the through-bore thereby to grip an optical fibre inserted into the through-bore via the second end portion, and the gripping means also including a collar which is a sliding fit around the holder, the collar being movable between first and second operating positions in which the intermediate portion of the bore is respectively constricted and not constricted.

2. A connector as in claim 1, wherein the first end portion of the through-bore has a larger diameter than the intermediate portion, the first end portion being separated from the intermediate portion by a step in the through-bore.

3. A connector as in claim 1, wherein the mouth of the second end portion tapers inwardly.

4. A connector as in claim 1, wherein the holder is shaped to define an external frustoconical surface whose axis coincides with that of the through-bore.

5. A connector as in claim 4, wherein said collar is movable along the frustoconical surface of the holder thereby to constrict the intermediate portion of the through-bore.

6. A connector as in claim 4, wherein the holder is formed with a circumferential groove positioned at the wider end portion of the frustoconical surface, and the inner circumferential edge of the collar is formed with the flange which is engageable within said groove.

7. A connector as in claim 1 wherein the holder is formed with a diametral slot extending from the end thereof containing the second end portion of the through-bore.

8. A connector as in claim 7, wherein the slot extends at least as far as said groove.

9. A connector assembly comprising a connector as in claim 1 and a standard optical connector.

10. A connector assembly as in claim 9, wherein the standard optical connector includes a ferrule housing, a ferrule holder mounted within the ferrule housing, and a ferrule fixedly mounted within the ferrule holder, the ferrule and the ferrule holder extending in opposite directions away from the ferrule housing.

11. A connector assembly as in claim 10, wherein the first end portion of the through-bore is sized and shaped to be an interference fit around the ferrule holder of the standard optical connector.

12. A connector assembly as in claim 10, further comprising a gripper for gripping the ferrule housing.

13. A connector assembly as in claim 12, wherein an annular ring constitutes the gripper, the ferrule housing being an interference fit within the inner peripheral edge portion of the annular ring.

14. A connector assembly for connecting an optical fiber to an optical device, said assembly comprising:

a holder and gripping means, the holder being formed with a through-bore having first and second end portions and an intermediate portion, the first end portion of the through-bore being sized and shaped to be an interference fit around one end portion of a standard fibre connector, the gripping means being engageable with the holder to constrict the intermediate portion of the through-bore thereby to grip an optical fibre inserted into the through-bore via the second end portion.

a standard optical connector including a ferrule housing, a ferrule holder mounted within the ferrule housing, and a ferrule fixedly mounted within the ferrule holder, the ferrule and the ferrule holder extending in opposite directions away from the ferrule housing, and a uniter having a pair of co-axial tubular arms extending in opposite directions from a housing which has a bore in alignment with the bores defined by the tubular arms, one of the tubular arms being adapted to fit around the ferrule of the standard optical connector and within the ferrule housing of that standard optical connector.

15. A connector assembly as in claim 14, wherein the other tubular arm is adapted to fit around the ferrule of another standard optical connector and within the ferrule housing of that other standard optical connector.

16. A connector assembly as in claim 14, wherein the tubular arms of the uniter are provided with external screw threads for engagement with internal screw threads on the corresponding ferrule housings.

17. A connector assembly as in claim 14, wherein the uniter housing is formed with a radial bore which terminates in the central bore thereof.

18. A method of terminating an optical fibre using a standard optical connector and a connector, the standard optical connector being constituted by a ferrule mounted in a ferrule holder, and the connector being constituted by a holder and a gripper, the connector holder being formed with an axial through-bore having first and second end portions and an intermediate portion, the method comprising the steps of:

a) fixing the standard optical connector to the connector holder with the ferrule holder of the standard optical connector positioned as an interference fit within the first end portion of the through-bore in the connector holder;

b) stripping the coating from an optical fibre to form a length of bare fibre at the end portion thereof;

c) inserting the optical fibre, bare end portion first, into the through-bore in the connector holder from the second end portion thereof, until the free end of the bare fibre end portion projects from the ferrule of the standard optical connector;

d) applying the gripper to the connector holder to constrict the intermediate portion of the through-bore, thereby firmly to grip the optical fibre in the intermediate portion; and e) cleaving the projecting portion of the bare fibre substantially flush with the free end face of the ferrule.

19. Apparatus for stripping the protective coating from an optical fibre, the apparatus comprising:

first and second supports, each of which is provided with an absorbent pad on one surface thereof, and means for clamping the second support to the first support so that the absorbent pads are pressed resiliently together, whereby, in use, liquid solvent is applied to the absorbent pads, an optical fibre is positioned between the absorbent pads, the two supports are clamped together, and the optical fibre is subsequently withdrawn from between the pads with the two supports in the clamped position.

20. An optical fiber connector assembly for optically coupling the stripped end of an optical fiber to another optical circuit, said assembly comprising:

an optical fiber connector including a ferrule having a coaxial bore sized to pass the stripped end of an optical fiber therethrough and a ferrule holder having a first end attached to one end of the ferrule and having a coaxial bore aligned with that of the ferrule but of larger diameter sized to pass an unstripped optical fiber therethrough;

a connector holder having a coaxial bore therethrough, a first end of the connector holder bore being sized to capture therewithin the second end of the ferrule holder and the connector holder bore being of smaller diameter than the adjacent ferrule holder bore to guide an inserted fiber thereinto while being flared to a larger diameter at its second end so as to provide a guided entrance for an optical fiber, and a movable externally grippable member disposed on said connector holder which constricts the size of an intermediate portion of its bore sufficient to nondestructively grip and retain an optical fiber therewithin when the member is moved in a predetermined way.

* * * * *